US012809087B2

(12) United States Patent
Kurino

(10) Patent No.: US 12,809,087 B2
(45) Date of Patent: Nov. 24, 2026

(54) PITCH CONVERTING APPARATUS

(71) Applicant: SUMITOMO ELECTRIC OPTIFRONTIER CO., LTD., Kanagawa (JP)

(72) Inventor: Shinsuke Kurino, Yokohama (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 305 days.

(21) Appl. No.: 18/578,839

(22) PCT Filed: Jul. 13, 2022

(86) PCT No.: PCT/JP2022/027578
§ 371 (c)(1),
(2) Date: Jan. 12, 2024

(87) PCT Pub. No.: WO2023/286807
PCT Pub. Date: Jan. 19, 2023

(65) Prior Publication Data

US 2024/0319444 A1 Sep. 26, 2024

(30) Foreign Application Priority Data

Jul. 14, 2021 (JP) ................................ 2021-116451

(51) Int. Cl.
*G02B 6/255* (2006.01)

(52) U.S. Cl.
CPC ......... *G02B 6/2556* (2013.01); *G02B 6/2557* (2013.01)

(58) Field of Classification Search
CPC ... G02B 6/3636; G02B 6/4243; G02B 6/3652
See application file for complete search history.

(56) References Cited

U.S. PATENT DOCUMENTS 5,611,017 A * 3/1997 Lee ...................... G02B 6/4403 385/53
6,295,400 B1 9/2001 Shahid
(Continued)

FOREIGN PATENT DOCUMENTS

CN 105173901 A 12/2015
EP 0543252 A1 5/1993
(Continued)

OTHER PUBLICATIONS

International Search Report dated Sep. 27, 2022 issued in PCT/JP2022/027578.
Written Opinion dated Sep. 27, 2022 issued in PCT/JP2022/027578.

*Primary Examiner* — Chad H Smith
(74) *Attorney, Agent, or Firm* — McDonald Hopkins LLC

(57) ABSTRACT

A pitch conversion device includes a main body portion configured to allow an optical fiber to be arranged thereon; and a turning portion configured to be attached to the main body portion. The turning portion includes a first holding portion configured to hold a plurality of the optical fibers at a first pitch, and a second holding portion configured to hold a plurality of the optical fibers at a second pitch. The turning portion rotates around an axis passing through an inside thereof in a state of being attached to the main body portion. A position at which the optical fibers are held is changeable to the first holding portion or the second holding portion depending on a rotation angle of the turning portion.

6 Claims, 8 Drawing Sheets

(56) References Cited

U.S. PATENT DOCUMENTS

| | | | |
|---|---|---|---|
| 10,107,964 | B1 | 10/2018 | Zhao |
| 2006/0285801 | A1 | 12/2006 | Aoki et al. |
| 2015/0344260 | A1 | 12/2015 | Seppelin et al. |
| 2015/0346126 | A1 | 12/2015 | Jakkula et al. |

FOREIGN PATENT DOCUMENTS

| | | | |
|---|---|---|---|
| JP | H11-506546 | A | 6/1999 |
| JP | 2003-322761 | A | 11/2003 |
| JP | 2008-225006 | A | 9/2008 |
| JP | 2019-159057 | A | 9/2019 |
| JP | 2020-144327 | A | 9/2020 |
| JP | 2021-033206 | A | 3/2021 |
| WO | 96/38751 | A2 | 12/1996 |

* cited by examiner

PITCH CONVERTING APPARATUS

TECHNICAL FIELD

The present disclosure relates to a pitch converting apparatus, i.e., a pitch conversion device. The present application claims priority based on Japanese Application No. 2021-116451 filed on Jul. 14, 2021, and incorporates all the contents described in the Japanese Application.

BACKGROUND ART

Patent Literature 1 discloses an optical fiber holding member capable of simultaneously holding a plurality of optical fibers. In the optical fiber holding member according to Patent Literature 1, a pitch of a V groove gradually increases, and a width of the V groove changes planarly over an axial direction of the optical fiber.

CITATION LIST

Patent Literature

Patent Literature 1: JP2020-144327A

SUMMARY OF INVENTION

A pitch conversion device according to an aspect of the present disclosure includes:

- a main body portion configured to allow an optical fiber to be arranged thereon; and
- a turning portion configured to be attached to the main body portion,
- the turning portion includes a first holding portion configured to hold a plurality of the optical fibers at a first pitch, and a second holding portion configured to hold a plurality of the optical fibers at a second pitch,
- the turning portion rotates around an axis passing through an inside thereof in a state of being attached to the main body portion, and
- a position at which the optical fibers are held is changeable to the first holding portion or the second holding portion depending on a rotation angle of the turning portion.

DESCRIPTION OF EMBODIMENTS

Technical Problem

Figure 1:
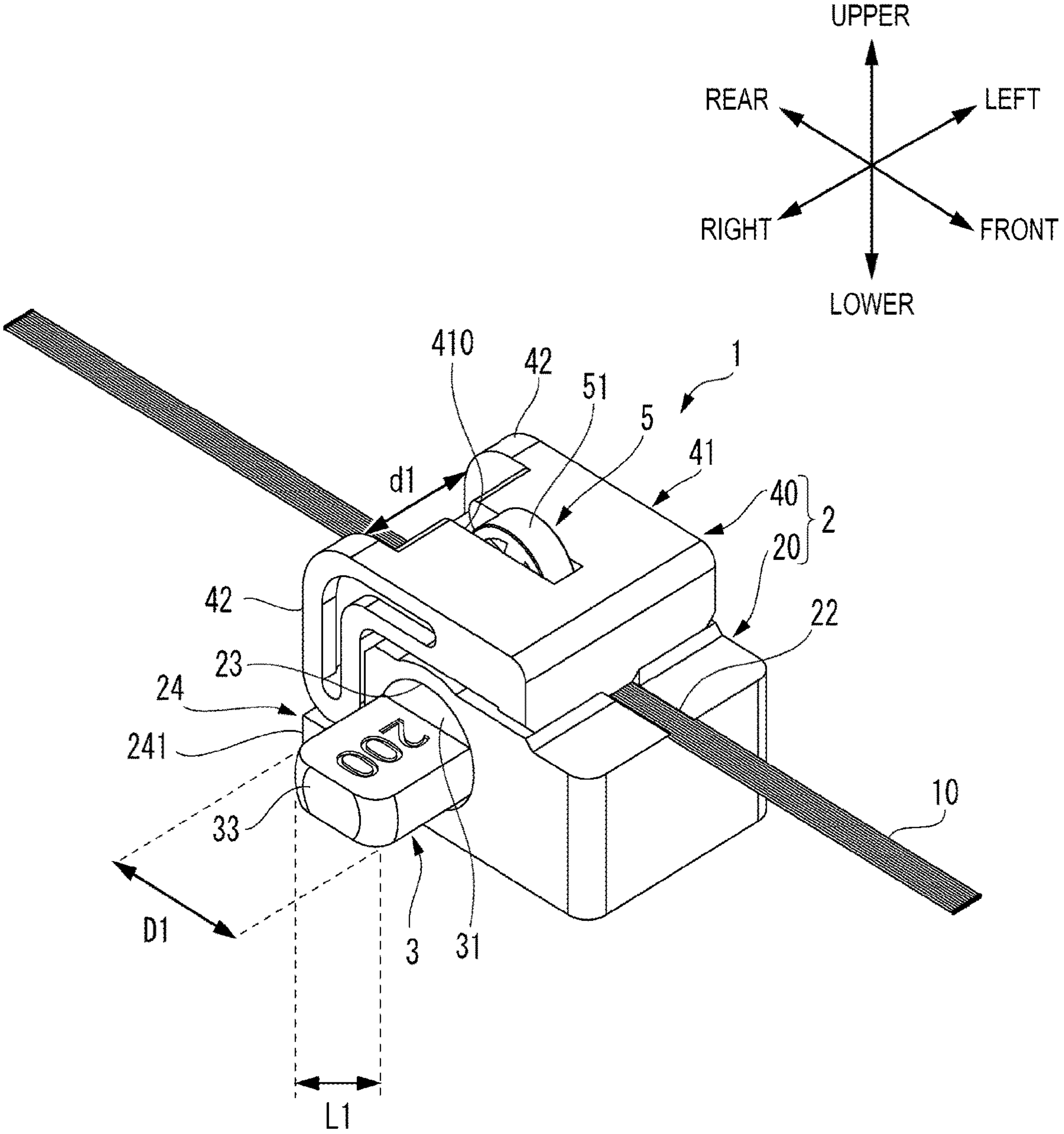
FIG. 1 is a perspective view of a pitch conversion device according to the present embodiment in a state where optical fibers are held.

As in the optical fiber holding member according to Patent Literature 1, when the width of the V groove changes planarly over the axial direction of the optical fiber, the pitch conversion device needs to have a certain length in the axial direction of the optical fiber and is less likely to be reduced in size.

An object of the present disclosure is to provide a compact pitch conversion device.

Advantageous Effects of Invention

According to the present disclosure, a compact pitch conversion device can be provided.

DESCRIPTIONS OF EMBODIMENTS

First, embodiments of the present disclosure will be listed and described.

(1) A pitch conversion device according to an aspect of the present disclosure includes:

- a main body portion configured to allow an optical fiber to be arranged thereon; and
- a turning portion configured to be attached to the main body portion,
- the turning portion includes a first holding portion configured to hold a plurality of the optical fibers at a first pitch, and a second holding portion configured to hold a plurality of the optical fibers at a second pitch,
- the turning portion rotates around an axis passing through an inside thereof in a state of being attached to the main body portion, and
- a position at which the optical fibers are held is changeable to the first holding portion or the second holding portion depending on a rotation angle of the turning portion.

According to the configuration, the pitch conversion device can change the position at which the optical fibers are held to the first holding portion or the second holding portion depending on the rotation angle of the turning portion which rotates in a state of being attached to the main body portion. As a result, the pitch of the optical fibers is converted into the first pitch or the second pitch. Therefore, in the pitch conversion device of the above configuration, the pitch of the optical fibers can be changed to the first pitch or the second pitch without slide-moving the optical fibers in an axial direction of the optical fibers. Thus, in the pitch conversion device of the above configuration, there is no need to secure a certain length in the axial direction of the optical fibers, so that the pitch conversion device can be made compact.

(2) Further, the pitch conversion device according to the aspect of the present disclosure further includes:

- a contact portion attached to at least one of the main body portion and the turning portion, the contact portion is arranged at a position facing the first holding portion or the second holding portion, and the contact portion is contactable with the optical fibers such that a holding state of the optical fibers held by the first holding portion or the second holding portion is maintained.

According to the configuration, for example, when the turning portion is turned, the optical fibers can be prevented from moving away from the turning portion. Therefore, according to such a pitch conversion device, a reduction in the pitch conversion workability can be prevented.

(3) Further, in the pitch conversion device according to the aspect of the present disclosure, the contact portion is a roller member that is rotatable in a direction opposite to a direction in which the turning portion rotates, and, an outer circumferential surface of the roller member is in contact with the optical fibers.

According to the configuration, since the outer circumferential surface of the roller member, which is the contact portion, is in contact with the optical fibers, the pitch of the optical fibers can be converted without applying an excessive load to the optical fibers.

(4) Further, in the pitch conversion device according to the aspect of the present disclosure, the main body portion includes a first arrangement portion having a width corresponding to the first holding portion and a second arrangement portion having a width corresponding to the second holding portion, and the first holding portion or the second holding portion is arranged between the first arrangement portion and the second arrangement portion.

According to the configuration, the optical fibers to be subjected to pitch conversion can be easily arranged in the first arrangement portion and the optical fibers after pitch conversion can be easily arranged in the second arrangement portion. Therefore, according to such a pitch conversion device, the pitch conversion workability can be improved.

(5) Further, in the pitch conversion device according to the aspect of the present disclosure, the turning portion has an outer circumferential surface having a circular cross section, the first holding portion and the second holding portion are arranged on the outer circumferential surface of the turning portion, the first holding portion is provided with a plurality of grooves at a first pitch, and the second holding portion is provided with a plurality of grooves at a second pitch.

According to the configuration, the optical fibers can be respectively placed in the plurality of grooves of each of the first holding portion and the second holding portion of the turning portion, the pitch of the optical fibers can be easily converted simply by turning the turning portion.

(6) Further, in the pitch conversion device according to the aspect of the present disclosure, a plurality of grooves having a pitch of an intermediate value between a value of the first pitch and a value of the second pitch are provided between the first holding portion and the second holding portion in a circumferential direction of the turning portion.

According to the configuration, the pitch of the optical fibers can be converted without applying an excessive load to the optical fibers.

DETAILS OF EMBODIMENTS

A specific example of a pitch conversion device according to an embodiment of the present disclosure will be described below with reference to the drawings. The present disclosure is not limited to these exemplifications, but is indicated by the scope of claims, and is intended to include all modifications within a scope and meaning equivalent to the scope of claims.

In the following description, a “front direction”, a “rear direction”, a “left direction”, a “right direction”, an “upper direction”, and a “lower direction” may be used, but these directions are relative directions set for convenience of description. These directions are based on directions shown in FIG. 1, and are also shown in other figures. In the following description, a “front-rear direction” is a direction including the “front direction” and the “rear direction”. A “left-right direction” is a direction including the “left direction” and the “right direction”. An “upper-lower direction” is a direction including the “upper direction” and the “lower direction”.

A pitch conversion device 1 according to the present embodiment will be described with reference to FIGS. 1 to 4C. The pitch conversion device 1 is used for, for example, adjusting a pitch of a plurality of optical fibers for a fusion splicer for fusion splicing the plurality of optical fibers simultaneously. As illustrated in FIG. 1, the pitch conversion device 1 includes a main body portion 2, a turning portion 3, and a roller member 5 (an example of a contact portion).

As illustrated in FIG. 1, the main body portion 2 includes a base portion 20 and a lid portion 40. The main body portion 2 is made of, for example, metal or resin. Although the present embodiment will be described assuming that the number of the optical fibers 10 is 12, the number of the optical fibers 10 is not limited thereto.

Figure 2:
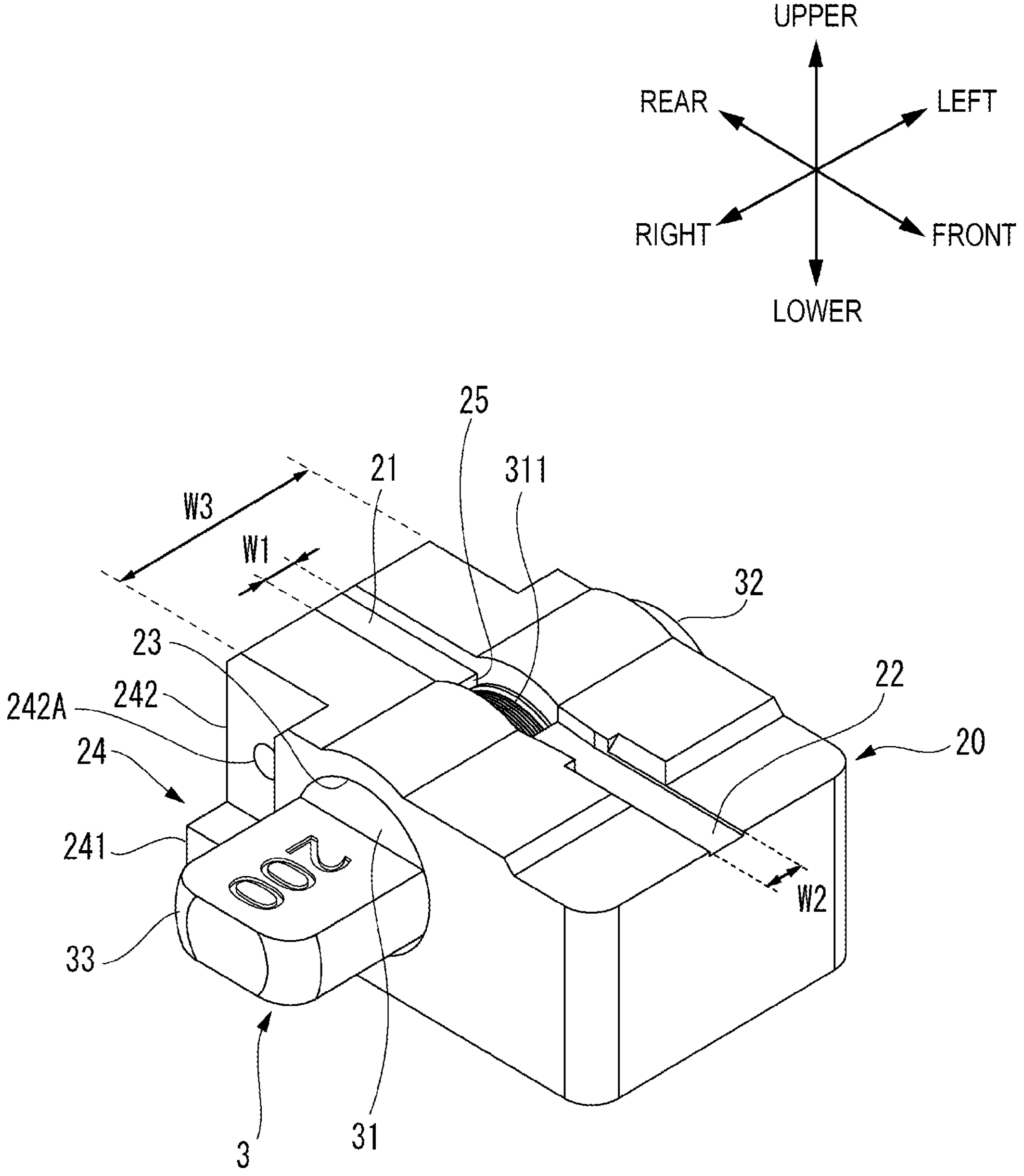
FIG. 2 is a perspective view of the pitch conversion device according to the present embodiment in a state where a lid portion and a roller member are removed.

The base portion 20 can arrange the optical fibers 10. As illustrated in FIGS. 1 and 2, the base portion 20 includes a first arrangement portion 21, a second arrangement portion 22, an insertion portion 23, a projection portion 24, and an opening portion 25.

The first arrangement portion 21 and the second arrangement portion 22 are substantially rectangular grooves extending in a longitudinal direction of the base portion 20 (the front-rear direction in FIG. 1). The first arrangement portion 21 is provided at a rear portion of the base portion 20, and the second arrangement portion 22 is provided at a front portion of the base portion 20. The optical fibers 10 can be arranged in the first arrangement portion 21 and the second arrangement portion 22. The first arrangement portion 21 has a width W1 corresponding to a first holding portion 311 to be described later. The second arrangement portion 22 has a width W2 corresponding to a second holding portion 312 (see FIG. 3) to be described later. The width W1 is, for example, 3 mm, and the width W2 is, for example, about 4 mm. Thus, the width W2 is larger than the width W1. However, the width W2 may be smaller than the width W1.

The insertion portion 23 is a hole portion having a circular cross section and penetrating the base portion 20 in the left-right direction. In the present embodiment, a diameter of the insertion portion 23 is D1. The turning portion 3 can be inserted into the insertion portion 23.

The projection portion 24 includes a rectangular portion 241 and a protrusion portion 242. The rectangular portion 241 has a substantially rectangular parallelepiped shape. The protrusion portion 242 is located above the rectangular portion 241. The protrusion portion 242 has a protrusion shape in a top view. The protrusion portion 242 has an insertion hole 242A. The insertion hole 242A is a hole portion having a circular cross section.

The opening portion 25 is a hole portion having a substantially rectangular shape in a top view. The opening portion 25 is provided substantially at a center of an upper surface of the base portion 20. The opening portion 25 is disposed between the first arrangement portion 21 and the second arrangement portion 22. In a state where the turning portion 3 is inserted into the insertion portion 23, a part of the turning portion 3 is exposed from the opening portion 25.

The lid portion 40 is substantially L-shaped in a side view, that is, when viewed from the right side in the state of FIG. 1. In the state of FIG. 1, the lid portion 40 is disposed to cover a part of the base portion 20. The lid portion 40 includes a first portion 41 and two second portions 42 each of which is provided to form a right angle with the first portion 41.

The first portion 41 has a flat plate shape. The first portion 41 faces the optical fibers 10 in a state where the optical fibers 10 are arranged on the base portion 20. The first portion 41 includes a cutout portion 410 extending in the front-rear direction. The cutout portion 410 is provided substantially at a center of the first portion 41. A length of the cutout portion 410 in the longitudinal direction (the front-rear direction in FIG. 1) is larger than a diameter of the roller member 5. A length of the cutout portion 410 in a short direction (the left-right direction in FIG. 1) is slightly larger than a length of the roller member 5 in a thickness direction (the left-right direction in FIG. 1).

In a state where the lid portion 40 is attached to the base portion 20, the second portion 42 is disposed above the rectangular portion 241 in the base portion 20 and at a position on a left side or a right side of the protrusion portion 242. A lower portion of the second portion 42 is provided with a projection portion (not shown) extending in a short direction of the second portion 42 (the left-right direction in FIG. 1), and the projection portion can be inserted into the insertion hole 242A. By inserting the projection portion of the second portion 42 into the insertion hole 242A, the lid portion 40 is rotatably attached to the base portion 20. In order to reduce the rigidity of the second portion 42 and easily widen the second portion 42 in the short direction of the second portion 42 (the left-right direction in FIG. 1), a groove substantially having a L shape in a side view is provided in the second portion 42. A distance d1, which is a distance between the two second portions 42, is smaller than the length of the first portion 41 in the left-right direction, and is larger than the length of the cutout portion 410 in the short direction (the left-right direction in FIG. 1). Further, the distance d1 is slightly larger than a width W3 of the protrusion portion 242 of the base portion 20 (a width of a rear portion of the protrusion portion 242).

The turning portion 3 is a cylindrical member made of resin or the like. The turning portion 3 is attached to the base portion 20 of the main body portion 2 by being inserted into the insertion portion 23. In a state of being attached to the base portion 20, the turning portion 3 is rotatable clockwise or counterclockwise around an axis passing through an inside of the turning portion. The first holding portion 311 or the second holding portion 312 of the turning portion 3 is arranged between the first arrangement portion 21 and the second arrangement portion 22 in a top view in the longitudinal direction of the base portion 20 (the front-rear direction in FIG. 2). The turning portion 3 includes a first cylindrical portion 31, a second cylindrical portion 32, and an operation portion 33.

Figure 3:
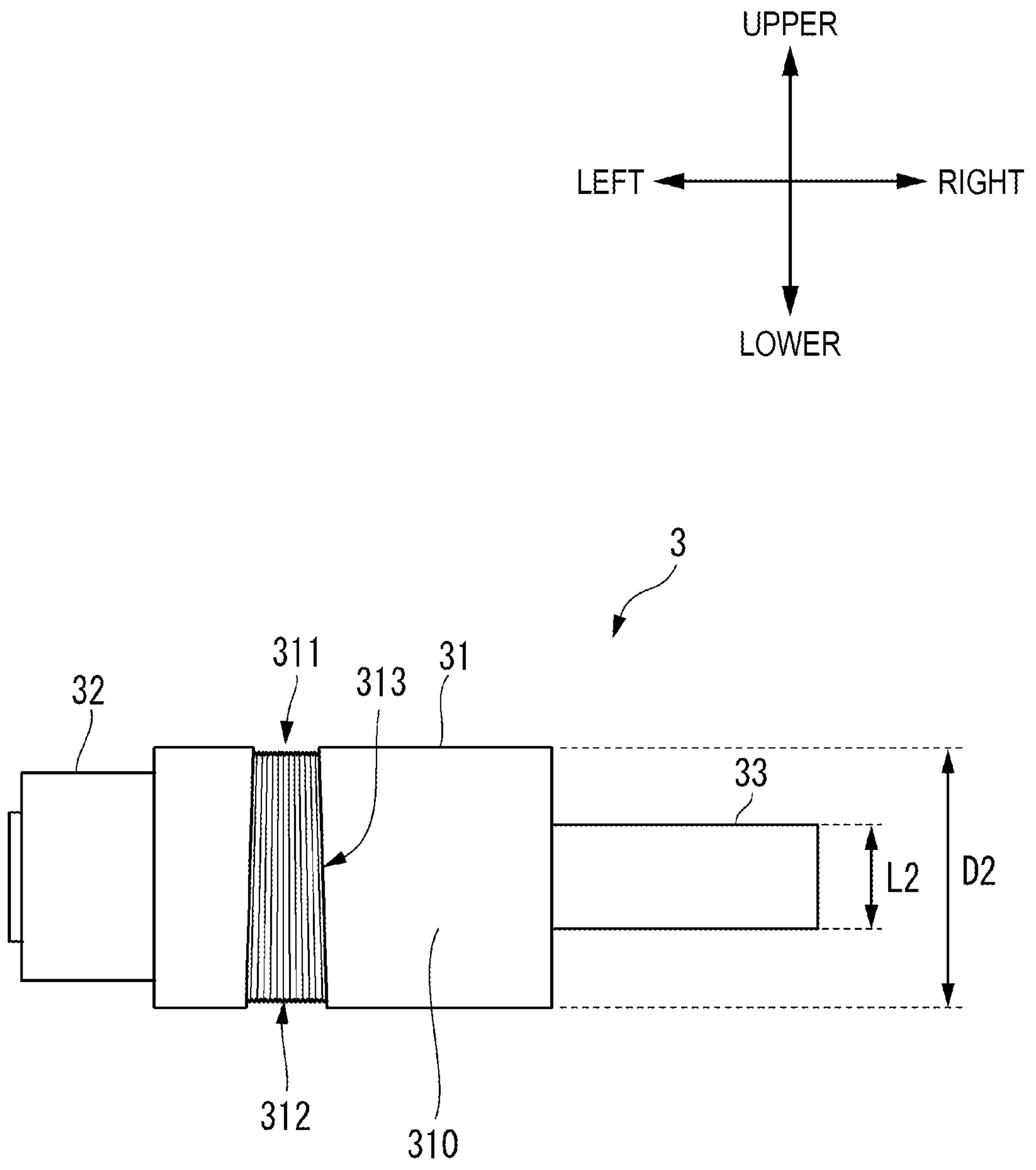
FIG. 3 is a view illustrating a turning portion according to the present embodiment.

As illustrated in FIGS. 1 to 3, the first cylindrical portion 31 has a substantially cylindrical shape. A diameter D2 (see FIG. 3) of the first cylindrical portion 31 is substantially equal to a diameter D1 (see FIG. 1) of the insertion portion 23. As illustrated in FIG. 3, the first cylindrical portion 31 is arranged between the second cylindrical portion 32 and the operation portion 33. The first cylindrical portion 31 includes the first holding portion 311, the second holding portion 312, and a third holding portion 313.

An outer circumferential surface 310 of the first cylindrical portion 31 has a circular shape in a cross-sectional view. The turning portion 3 rotates with an axis passing through a center of the circular outer circumferential surface 310 in the cross-sectional view as a turning axis. The first holding portion 311, the second holding portion 312, and the third holding portion 313 are arranged in a circumferential direction of the first cylindrical portion 31 on the outer circumferential surface 310. That is, the first holding portion 311 and the second holding portion 312 are arranged on the outer circumferential surface 310 of the turning portion 3.

Figure 4A:
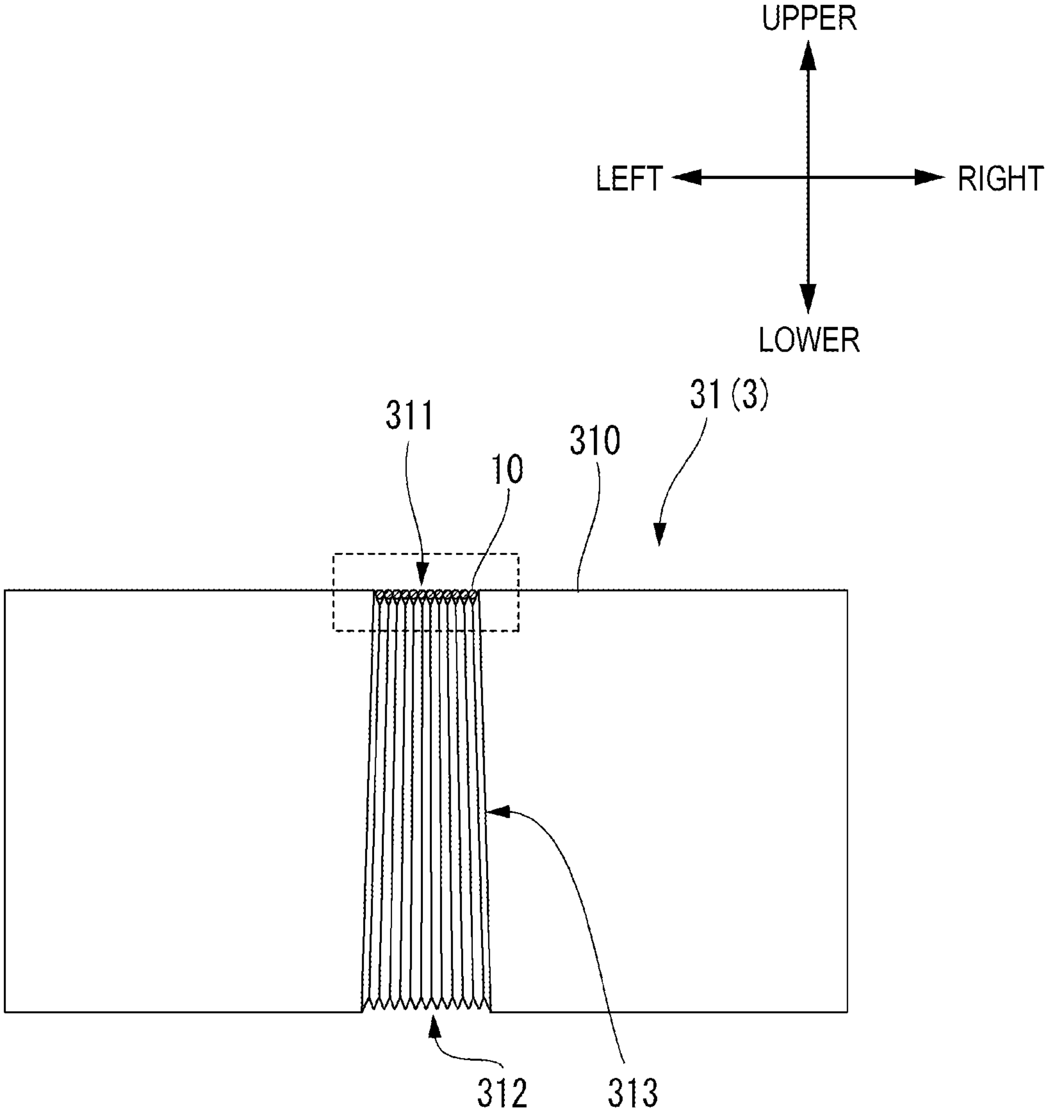
FIG. 4A is a schematic diagram illustrating a positional relationship between the optical fibers and the turning portion in a state where the optical fibers are held by a first holding portion.
Figure 4A:
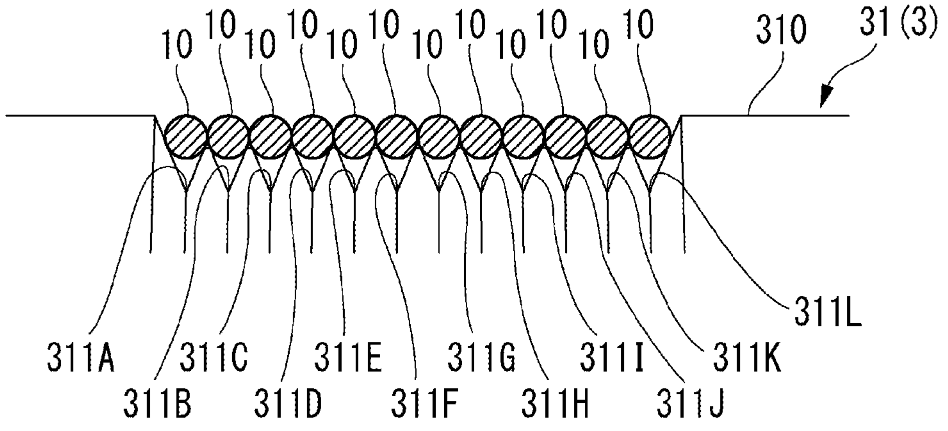
Figure 4B:
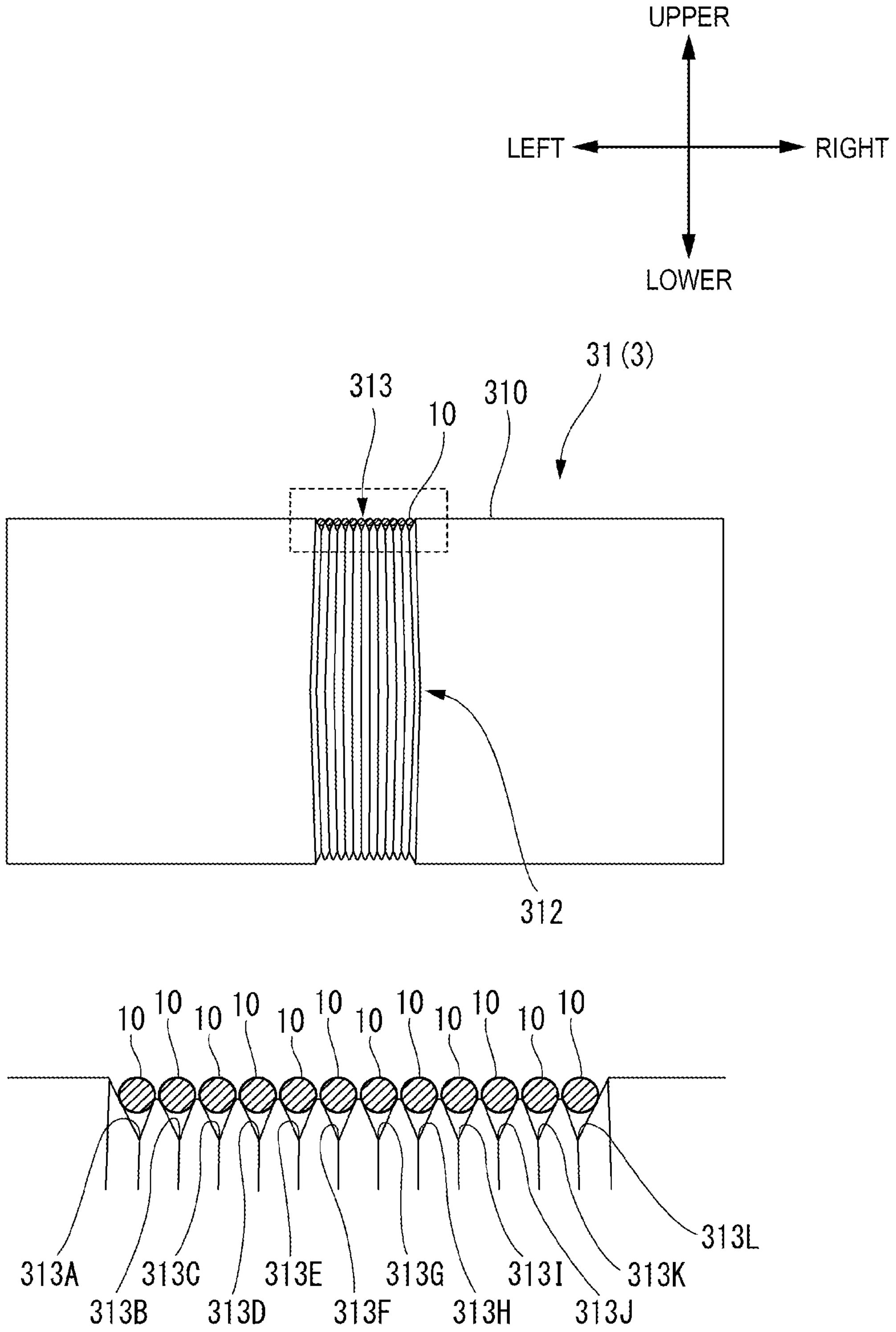
FIG. 4B is a schematic diagram illustrating a positional relationship between the optical fibers and the turning portion in a state where the optical fibers are held by a third holding portion.
Figure 4C:
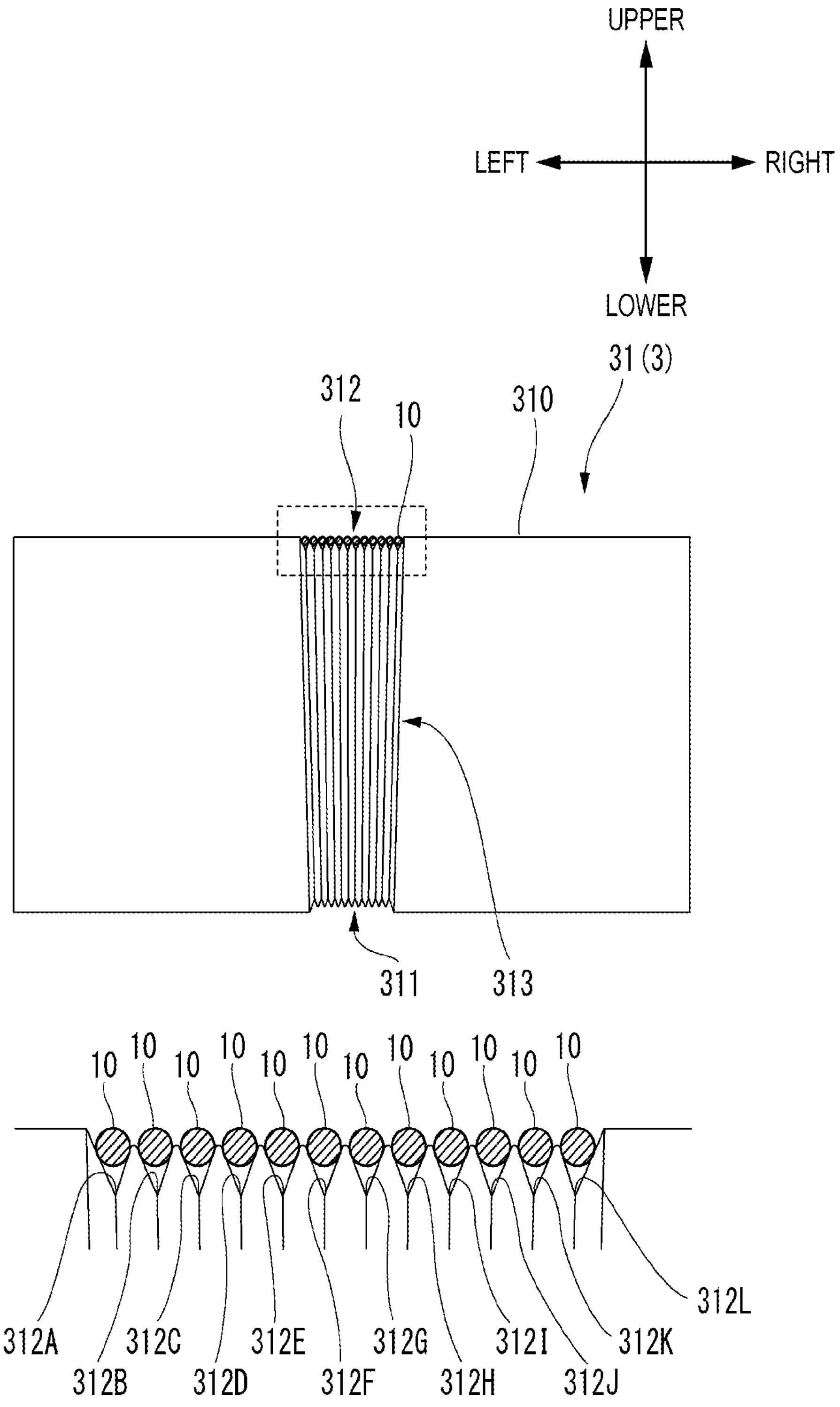
FIG. 4C is a schematic diagram illustrating a positional relationship between the optical fibers and the turning portion in a state where the optical fibers are held by a second holding portion.

Here, the first holding portion 311, the second holding portion 312, and the third holding portion 313 will be described with reference to FIGS. 3 to 4C. FIGS. 4A to 4C illustrate a state in which the optical fibers 10 are held. Views illustrated in lower parts of FIGS. 4A to 4C are enlarged views of portions surrounded by broken lines in the views illustrated in the upper parts of FIGS. 4A to 4C. As illustrated in FIGS. 4A and 4C, the first holding portion 311 is provided with a plurality of grooves 311A to 311L at a first pitch, and the second holding portion 312 is provided with a plurality of grooves 312A to 312L at a second pitch. In the present embodiment, the first pitch is 200 μm, and the second pitch is 250 μm. The grooves 311A to 311L of the first holding portion 311 and the grooves 312A to 312L of the second holding portion 312 are, for example, V-shaped grooves. However, the grooves 311A to 311L of the first holding portion 311 and the grooves 312A to 312L of the second holding portion 312 may be U-shaped grooves, for example. The optical fibers 10 are held one by one in the grooves 311A to 311L of the first holding portion 311 and the grooves 312A to 312L of the second holding portion 312. Therefore, the grooves 311A to 311L of the first holding portion 311 can hold the optical fibers 10 at the first pitch, and the grooves 312A to 312L of the second holding portion 312 can hold the optical fibers 10 at the second pitch.

As illustrated in FIGS. 3 and 4B, a plurality of grooves having a pitch of an intermediate value between a value of the first pitch and a value of the second pitch are provided between the first holding portion 311 and the second holding portion 312 in the circumferential direction of the first cylindrical portion 31. In the present embodiment, a plurality of grooves (for example, a plurality of grooves 313A to 313L included in the third holding portion 313 illustrated in FIG. 4B) are provided at a portion of the outer circumferential surface 310 of the first cylindrical portion 31 other than portions where the first holding portion 311 and the second holding portion 312 are arranged. The third holding portion 313 is arranged between the first holding portion 311 and the second holding portion 312 in the circumferential direction of the first cylindrical portion 31. A pitch of the plurality of grooves 313A to 313L continuously changes in the circumferential direction of the first cylindrical portion 31 from one of the first holding portion 311 and the second holding portion 312 to the other. In the present embodiment, the pitch of the plurality of grooves 313A to 313L changes continuously and gradually from 200 μm to 250 μm.

As illustrated in FIGS. 2 and 3, the second cylindrical portion 32 is a cylindrical portion provided to protrude from a left side surface of the base portion 20 in a state where the turning portion 3 is attached to the base portion 20 of the main body portion 2.

As illustrated in FIGS. 1 to 3, the operation portion 33 is a plate-shaped member and can be gripped by an operator. The operation portion 33 is disposed on a right side of the first cylindrical portion 31. A length L1 of the operation portion 33 in a radial direction of the turning portion 3 is substantially equal to the diameter D2 of the first cylindrical portion 31. A length L2 of the operation portion 33 in a thickness direction (the upper-lower direction in FIG. 3) is smaller than the diameter D2 of the first cylindrical portion 31.

A debossed character or a numeral is displayed on the operation portion 33. In the state illustrated in FIG. 1, a numeral "200" is displayed on an upper surface of the operation portion 33, and a numeral "250" (not illustrated) is displayed on a lower surface of the operation portion 33 (a back surface of the upper surface of the operation portion 33). In a turning direction of the turning portion 3 (the circumferential direction of the first cylindrical portion 31), the first holding portion 311 is arranged on a side where the numeral "200" is displayed, and the second holding portion 312 is arranged on a side where the numeral "250" is displayed. Therefore, in the state illustrated in FIG. 1, the optical fibers 10 are held by the first holding portion 311.

The roller member 5 may be made of, for example, resin. The roller member 5 has an outer circumferential surface 51 having a circular shape in a cross-sectional view. The roller member 5 is rotatably attached to the lid portion 40 of the main body portion 2. The roller member 5 is disposed to be surrounded by the cutout portion 410 of the first portion 41. The roller member 5 is disposed at a position facing the first holding portion 311, the second holding portion 312, or the third holding portion 313. The roller member 5 is disposed such that a space for holding the optical fibers 10 is formed between the roller member 5 and the first holding portion 311, the second holding portion 312, or the third holding portion 313. The optical fibers 10 are accommodated in the space. When an upward force is applied to the optical fibers 10 in a state where the optical fibers 10 are accommodated in the space and the optical fibers 10 try to move upward, the roller member 5 comes into contact with the optical fibers 10 and prevents the upward movement of the optical fibers 10. That is, the roller member 5 prevents the optical fibers 10 from moving away from the turning portion 3. Thus, the roller member 5 can be in contact with the optical fibers 10 such that a holding state of the optical fibers 10 held by the first holding portion 311, the second holding portion 312, or the third holding portion 313 is maintained. The roller member 5 is rotatable in a direction opposite to the rotation direction of the turning portion 3.

Method of Using Pitch Conversion Device of Present Embodiment

Next, an example of a method of using the pitch conversion device 1 will be described with reference to FIGS. 1 to 2 and FIGS. 5A to 5B. In the present embodiment, an example in which the pitch of the optical fibers 10 is converted from 200 μm to 250 μm will be described.

As illustrated in FIGS. 1 and 2, the operator rotates (turns) the turning portion 3 such that the first holding portion 311 is exposed upward from the opening portion 25. Next, the operator turns the lid portion 40 with respect to the base portion 20 to open the lid portion 40, passes the optical fibers 10 between the base portion 20 and the lid portion 40 from the rear of the pitch conversion device 1, and arranges the optical fibers 10 in the first arrangement portion 21 and the second arrangement portion 22. Then, the operator causes the first holding portion 311 to hold the optical fibers 10. The operator closes the lid portion 40 when the optical fibers 10 are held by the first holding portion 311. Thus, the optical fibers 10 held by the first holding portion 311 are also held by the roller member 5 from above.

Figure 5A:
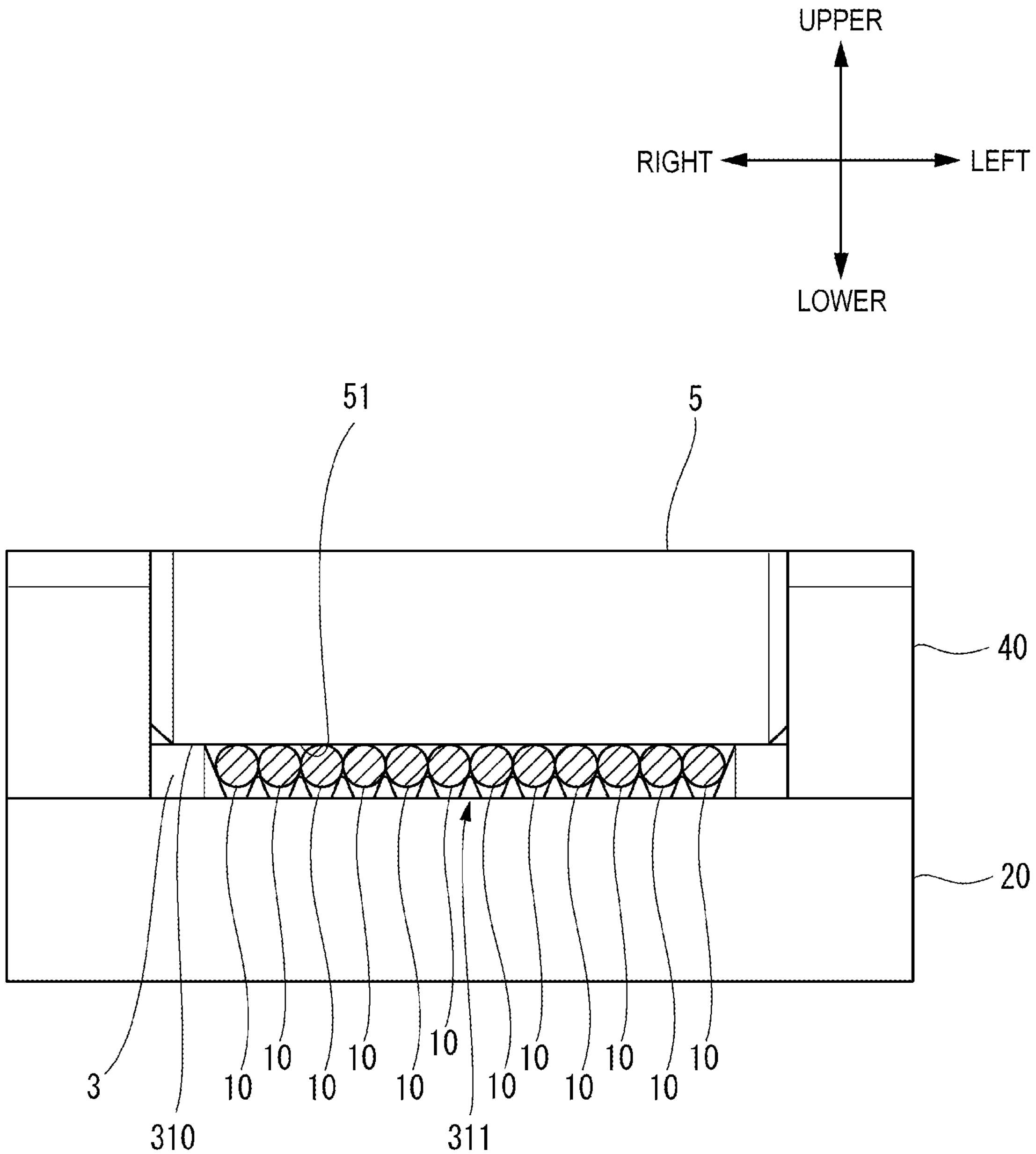
FIG. 5A is a diagram illustrating a positional relationship between the optical fibers and the roller member in a state where the optical fibers are held by the first holding portion.
Figure 5B:
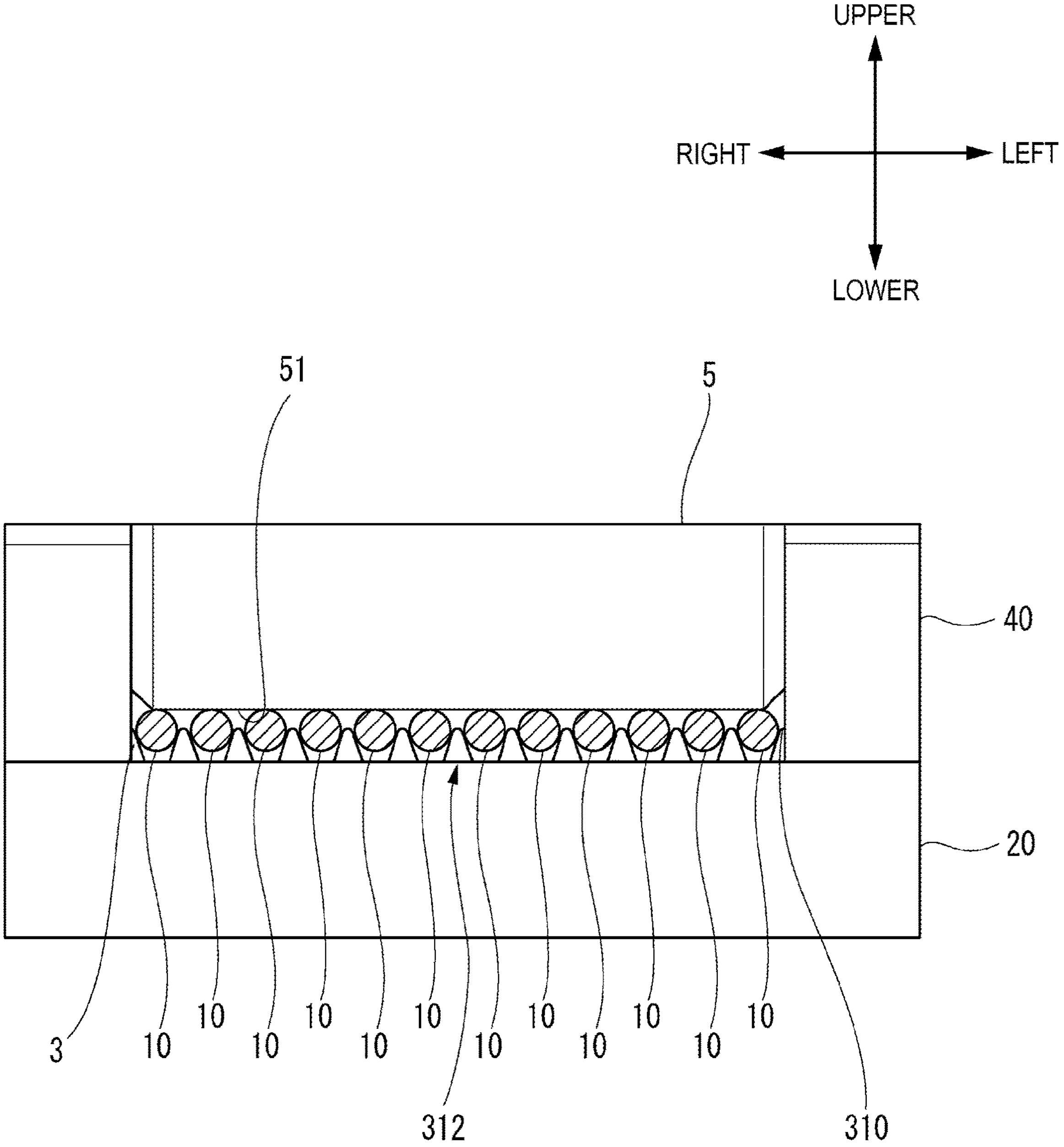
FIG. 5B is a diagram illustrating a positional relationship between the optical fibers and the roller member in a state where the optical fibers are held by the second holding portion.

Next, the operator turns the operation portion 33 clockwise by a half circle. Then, the first cylindrical portion 31 also rotates (is turned) clockwise by a half circle. At this time, since the optical fibers 10 held by the first holding portion 311 are subjected to a force in a direction toward the second arrangement portion 22 (the front direction in FIG. 1) and an upward force with respect to the main body portion 2, the optical fibers 10 try to move in these directions (the front direction and the upper direction in FIG. 1). However, as illustrated in FIGS. 5A and 5B, the outer circumferential surface 51 of the roller member 5 is in contact with the optical fibers 10, and the roller member 5 turns counterclockwise together with the optical fibers 10 due to a static frictional force between the roller member 5 and the optical fibers 10. Therefore, the roller member 5 can prevent the optical fibers 10 from moving upward. That is, the roller member 5 can prevent the optical fibers 10 from moving away from the turning portion 3.

While the turning portion 3 turns clockwise by a half circle, the pitch of the optical fibers 10 continuously changes along the plurality of grooves provided in the outer circumferential surface 310. That is, the pitch of the optical fibers 10 is initially 200 μm as illustrated in FIG. 5A, but changes to 250 μm as illustrated in FIG. 5B when the turning portion 3 turns clockwise by a half circle. Thus, a position where the optical fibers 10 are held is changed from the first holding portion 311 to the second holding portion 312 depending on a rotation angle (a turning angle) of the turning portion 3.

Further, the position where the optical fibers 10 are held can be changed from the second holding portion 312 to the first holding portion 311 depending on the rotation angle (the turning angle) of the turning portion 3. Specifically, the operator turns the turning portion 3 such that the second holding portion 312 is exposed upward from the opening portion 25, and causes the second holding portion 312 to hold the optical fibers 10. Then, the operator turns the operation portion 33 counterclockwise by a half circle. Thus, the position where the optical fibers 10 are held can be changed from the second holding portion 312 to the first holding portion 311 depending on the rotation angle (the turning angle) of the turning portion 3.

As illustrated in FIG. 2, the first arrangement portion 21 having the width W1 corresponding to the first holding portion 311 is provided rearward of the turning portion 3, and the second arrangement portion 22 having the width W2 corresponding to the second holding portion 312 is provided forward of the turning portion 3. That is, since the first arrangement portion 21 has the width W1 corresponding to the pitches of the optical fibers 10 before pitch conversion, the operator can position the optical fibers 10 before pitch conversion at appropriate positions with respect to the first holding portion 311. Further, since the second arrangement portion 22 has the width W2 corresponding to the pitches of the optical fibers 10 after pitch conversion, the operator can set the optical fibers 10 to the fusion splicer while maintaining a desired pitch of the optical fibers 10 after pitch conversion.

In the pitch conversion device 1 as described above, the position where the optical fibers 10 are held can be changed to the first holding portion 311 or the second holding portion 312 depending on the rotation angle of the turning portion 3 that rotates around the axis passing through the inside thereof in a state of being attached to the main body portion 2. As a result, for example, the pitch of the optical fibers 10 is converted from 200 μm (the first pitch) to 250 μm (the second pitch). Therefore, in the pitch conversion device 1, the pitch of the optical fibers 10 can be converted from 200 μm to 250 μm without sliding the optical fibers 10 in the axial direction of the optical fibers 10. Thus, in the pitch conversion device 1, there is no need to secure a certain length in the axial direction of the optical fibers 10, and the pitch conversion device 1 is made compact.

Further, according to the pitch conversion device 1, the roller member 5 can be in contact with the optical fibers 10 such that the holding state of the optical fibers 10 held by the first holding portion 311 or the second holding portion 312 is maintained. Therefore, for example, when the turning portion 3 is turned, the optical fibers 10 can be prevented from moving away from the turning portion 3. Therefore, the pitch conversion device 1 can prevent a reduction in the pitch conversion workability.

Further, according to the pitch conversion device 1, the roller member 5 is rotatable in a direction opposite to the direction in which the turning portion 3 rotates, and the outer circumferential surface 51 of the roller member 5 is in contact with the optical fibers. Therefore, the pitch conversion device 1 can convert the pitch of the optical fibers 10 without applying an excessive load to the optical fibers 10.

Further, according to the pitch conversion device 1, the main body portion 2 includes the first arrangement portion 21 having the width W1 corresponding to the first holding portion 311 and the second arrangement portion 22 having the width W2 corresponding to the second holding portion 312, and the first holding portion 311 or the second holding portion 312 of the turning portion 3 is arranged between the first arrangement portion 21 and the second arrangement portion 22. Therefore, the optical fibers 10 to be subjected to pitch conversion can be easily arranged in the first arrangement portion 21 and the optical fibers after pitch conversion can be easily arranged in the second arrangement portion 22. Therefore, according to the pitch conversion device 1, the pitch conversion workability can be improved.

Further, according to the pitch conversion device 1, the first holding portion 311 and the second holding portion 312 are arranged on the outer circumferential surface of the turning portion 3. The first holding portion 311 is provided with a plurality of grooves 311A to 311L at a pitch of 200 μm, and the second holding portion 312 is provided with a plurality of grooves 312A to 312L at a pitch of 250 μm. Since the optical fibers 10 can be respectively placed in the plurality of grooves, the pitch of the optical fibers 10 can be easily converted simply by turning the turning portion 3.

Further, according to the pitch conversion device 1, a plurality of grooves having a pitch of an intermediate value between a value of the first pitch and a value of the second pitch are provided between the first holding portion 311 and the second holding portion 312 in the circumferential direction of the turning portion 3. Specifically, the pitch of the grooves between the first holding portion 311 and the second holding portion 312 continuously changes in the circumferential direction of the turning portion 3. Therefore, according to the pitch conversion device 1, the pitch of the optical fibers 10 can be converted without applying an excessive load to the optical fibers 10.

Although the present disclosure has been described in detail and with reference to the specific embodiments, it will be apparent to those skilled in the art that various changes and modifications can be made without departing from the spirit and scope of the present disclosure. In addition, the number, positions, shapes, and the like of the constituent members described above are not limited to those in the above-described embodiment, and can be changed to suitable numbers, positions, shapes, and the like in carrying out the present disclosure.

In the above-described embodiment, the pitch of the plurality of grooves arranged in the outer circumferential surface 310 of the first cylindrical portion 31 continuously changes in the circumferential direction of the first cylindrical portion 31, but may change discontinuously.

In the above-described embodiment, a plurality of grooves (for example, the plurality of grooves 313A to 313L) are provided at a portion of the outer circumferential surface 310 of the first cylindrical portion 31 other than the portions where the first holding portion 311 and the second holding portion 312 are arranged, but the grooves may not be provided on these portions.

In the above-described embodiment, the numerals "200" and "250" are displayed on the operation portion 33, but for example, characters or the like may be displayed.

In the above-described embodiment, the first pitch is 200 μm, and the second pitch is 250 μm, but the present disclosure is not limited thereto. For example, the first pitch may be 180 μm, and the second pitch may be 250 μm, or the first pitch may be 180 μm, and the second pitch may be 200 μm. Further, the width W1 of the first arrangement portion 21 and the width W2 of the second arrangement portion 22 may be appropriately changed depending on the first pitch and the second pitch.

In the above-described embodiment, the pitch of the optical fibers 10 is converted from 200 μm to 250 μm, but the pitch of the optical fibers 10 may be converted from 250 μm to 200 μm, for example. That is, the pitch of the optical fibers 10 may be widened or narrowed by the pitch conversion device 1.

In the above-described embodiment, the pitch conversion device 1 is a device separated from a fiber holder, but the pitch conversion device 1 may be, for example, a base member of the fiber holder.

The above-described embodiment is described using the roller member 5 as an example of the contact portion, the present disclosure is not limited thereto. Instead of the roller member 5, for example, a plate-shaped member or the like may be used as the contact portion. In this case, the contact portion may be attached to at least one of the main body portion and the turning portion.

REFERENCE SIGNS LIST

- 1: pitch conversion device
- 2: main body portion
- 3: turning portion
- 5: roller member
- 10: optical fiber
- 20: base portion
- 21: first arrangement portion
- 22: second arrangement portion
- 23: insertion portion
- 24: projection portion
- 25: opening portion
- 31: first cylindrical portion
- 32: second cylindrical portion
- 33: operation portion
- 40: lid portion

41: first portion
42: second portion
51: outer circumferential surface
241: rectangular portion
242: protrusion portion
242A: insertion hole
310: outer circumferential surface
311: first holding portion
311A to 311L: groove
312: second holding portion
312A to 312L: groove
313: third holding portion
313A to 313L: groove
410: cutout portion
d1: distance
D1: diameter of insertion portion
D2: diameter of first cylindrical portion
L1: length of operation portion in radial direction of turning portion
L2: length of operation portion in thickness direction
W1: width corresponding to the first holding portion
W2: width corresponding to second holding portion
W3: width of protrusion portion

The invention claimed is:

1. A pitch conversion device comprising:
a main body portion configured to allow an optical fiber to be arranged thereon and including a base portion and a lid portion disposed to cover a part of the base portion;
a turning portion attached to the base portion; and
a contact portion rotatably attached to the lid portion, wherein
the turning portion includes a first holding portion configured to hold a plurality of the optical fibers at a first pitch, and a second holding portion configured to hold a plurality of the optical fibers at a second pitch,
the turning portion rotates around an axis passing through an inside thereof in a state of being attached to the main body portion,
a position at which the optical fibers are held is changeable to the first holding portion or the second holding portion depending on a rotation angle of the turning portion,
the lid portion includes a cutout portion extending in a longitudinal direction of the lid portion and provided substantially at a center of the lid portion, and
the contact portion is disposed to be surrounded by the cutout portion.

2. The pitch conversion device according to claim 1, wherein
the contact portion is arranged at a position facing the first holding portion or the second holding portion, and
the contact portion is contactable with the optical fibers such that a holding state of the optical fibers held by the first holding portion or the second holding portion is maintained.

3. The pitch conversion device according to claim 1, wherein
the main body portion includes a first arrangement portion having a width corresponding to the first holding portion and a second arrangement portion having a width corresponding to the second holding portion, and
the first holding portion or the second holding portion is arranged between the first arrangement portion and the second arrangement portion.

4. The pitch conversion device according to claim 1, wherein
the turning portion has an outer circumferential surface having a circular cross section,
the first holding portion and the second holding portion are arranged on the outer circumferential surface of the turning portion,
the first holding portion is provided with a plurality of grooves at a first pitch, and
the second holding portion is provided with a plurality of grooves at a second pitch.

5. The pitch conversion device according to claim 4, wherein
a plurality of grooves having a pitch of an intermediate value between a value of the first pitch and a value of the second pitch are provided between the first holding portion and the second holding portion in a circumferential direction of the turning portion.

6. A pitch conversion device comprising:
a main body portion configured to allow an optical fiber to be arranged thereon and including a base portion and a lid portion disposed to cover a part of the base portion;
a turning portion attached to the base portion; and
a contact portion rotatably attached to the lid portion, wherein
the turning portion includes a first holding portion configured to hold a plurality of the optical fibers at a first pitch, and a second holding portion configured to hold a plurality of the optical fibers at a second pitch,
the turning portion rotates around an axis passing through an inside thereof in a state of being attached to the main body portion,
a position at which the optical fibers are held is changeable to the first holding portion or the second holding portion depending on a rotation angle of the turning portion, wherein
the contact portion is arranged at a position facing the first holding portion or the second holding portion, and
the contact portion is contactable with the optical fibers such that a holding state of the optical fibers held by the first holding portion or the second holding portion is maintained,
the contact portion is a roller member that is rotatable in a direction opposite to a direction in which the turning portion rotates, and,
an outer circumferential surface of the roller member is in contact with the optical fibers.

* * * * *